B. F. HOARD & G. A. PAINE.
ROTARY ENGINE.
APPLICATION FILED MAR. 23, 1908.
904,781.
Patented Nov. 24, 1908.
2 SHEETS—SHEET 2.
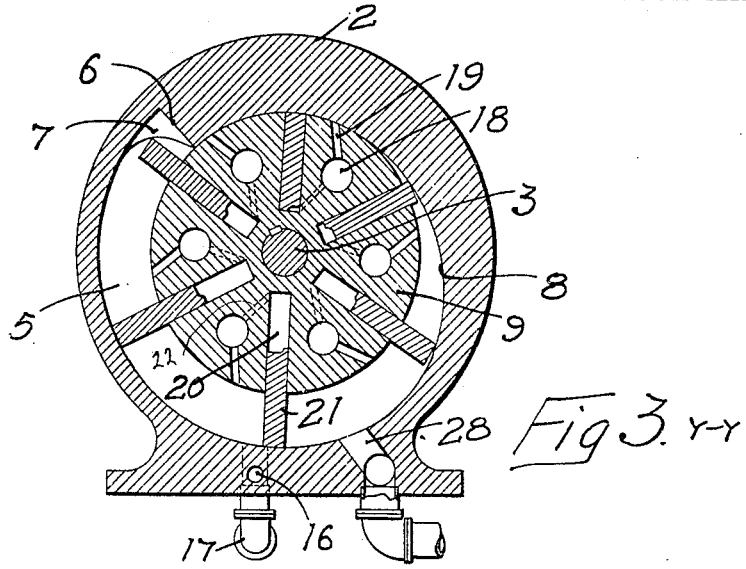
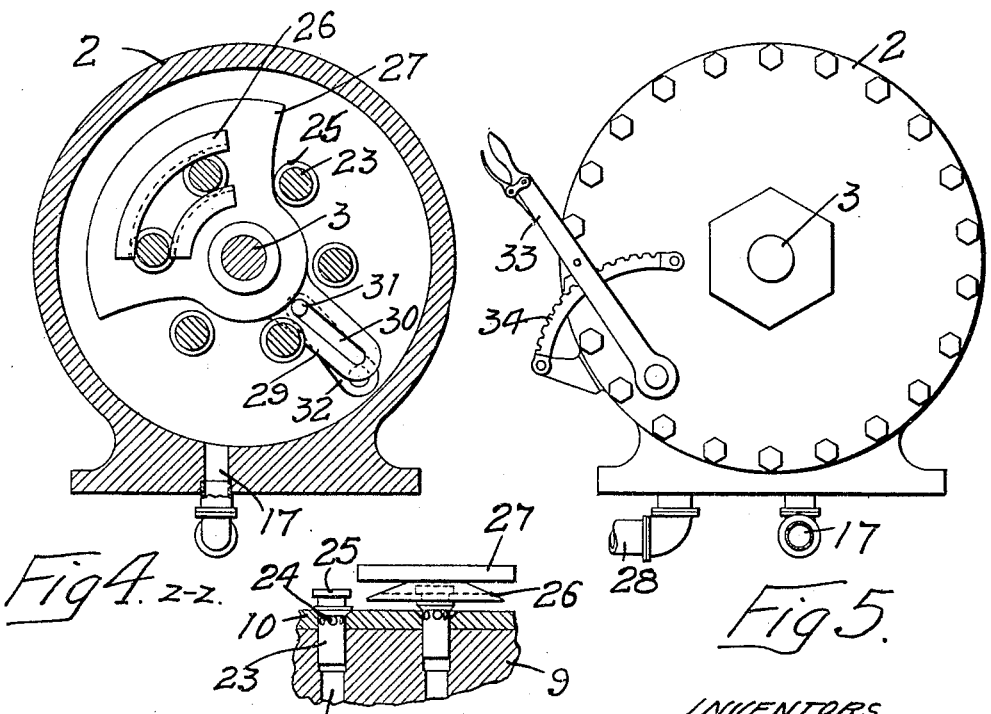
WITNESSES
John C. Rennie
J. A. Byington
INVENTORS
BERNARD F. HOARD
GEORGE A. PAINE
BY Paul & Paul
THEIR ATTORNEYS

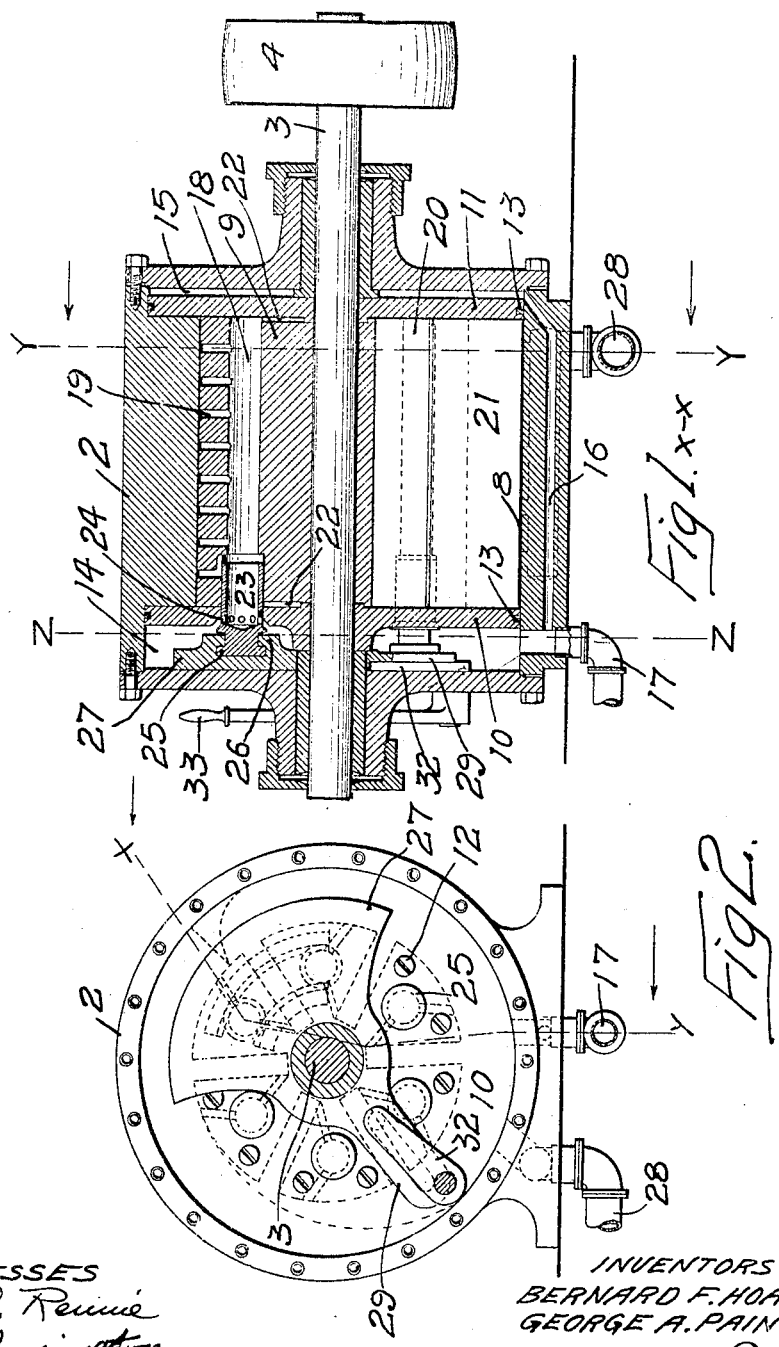

UNITED STATES PATENT OFFICE.

BERNARD F. HOARD AND GEORGE A. PAINE, OF MINNEAPOLIS, MINNESOTA.

ROTARY ENGINE.

No. 904,781.  Specification of Letters Patent.  Patented Nov. 24, 1908.

Application filed March 23, 1908. Serial No. 422,778.

*To all whom it may concern:*

Be it known that we, BERNARD F. HOARD and GEORGE A. PAINE, of Minneapolis, Hennepin county, Minnesota, have invented certain new and useful Improvements in Rotary Engines, of which the following is a specification.

The object of our invention is to provide a rotary engine of simple construction and one in which the full expansive power of the steam is utilized.

A further object is to provide a rotary engine having a balanced piston and one in which the friction of the moving parts is reduced to a minimum.

A further object is to provide a rotary engine having means whereby the time of admission of live steam to the piston and the cut off can be hastened or delayed, as desired.

Other objects of the invention will appear from the following detailed description.

The invention consists generally, in various constructions and combinations, all as hereinafter described and particularly pointed out in the claims.

In the accompanying drawings, forming part of this specification, Figure 1 is a longitudinal sectional view of a rotary engine embodying our invention, taken on the section line *x—x* of Fig. 2. Fig. 2 is an end view of the same, partially in section. Fig. 3 is a sectional view on the line *y—y* of Fig. 1. Fig. 4 is a sectional view on the line *z—z* of Fig. 1. Fig. 5 is an end view of the engine. Fig. 6 is a detail view illustrating the manner of opening the valves to admit steam pressure to the piston.

In the drawing, 2 represents the cylinder, 3 a shaft journaled in the heads of the cylinder and provided with a driving pulley 4. The cylinder is provided with a chamber 5 having an abutment 6 formed in the walls thereof and a series of ribs 7 having curved edges and adapted to contact with the radially moving wings of the piston, as will hereinafter appear.

A surface 8 is formed on the cylinder wall gradually drawing nearer the center of the cylinder until the abutment 6 is reached. This wall 8 has the effect of returning the piston wings to their normal position after they pass the exhaust port and before reaching the intake.
9 is a piston mounted on the shaft 3 and provided with disks 10 and 11 that are secured to its ends by any suitable means, as screws 12. These disks have packing rings 13 in their outer edges, which contact with the walls of the cylinder and form steam tight joints therewith.

A steam chest 14 is provided between the disk 10 and the head of the cylinder, and a space 15 is formed between the disk 11 and the contiguous cylinder head and communicates through a passage 16 with the steam intake pipe 17. The pressure entering the pipe 17 and flowing into the steam chest will also pass to the opposite end of the passage into the chamber 15 and balance the piston in the cylinder, the pressure being uniform at each end.

The piston has a series of passages 18 extending lengthwise therein, each passage having a series of ports 19 leading through the outer wall of the piston to the cylinder chamber 5. We have shown six of these passages but a greater or less number may be employed, if preferred.

Intermediate to the passages 18 we provide a series of radial recesses 20 adapted to receive radially moving wings or slides 21. The outer edges of these slides are adapted to contact with the wall of the cylinder and temporarily form with the abutment 6 a confined space into which the live steam is admitted through the ports 19. Ports 22 lead from the passages 18 into the recesses 20 and the fluid pressure entering a passage 18 will flow down through the ports 22 and force out the slides.

As indicated in Fig. 1 we prefer to provide a series of the ports 19 communicating with each passage 18. Our object in this is to compel the steam to pass through a small opening and prevent it from losing its expansive power until it enters the chamber of the cylinder.

For the purpose of regulating the entrance of steam to the piston passages 18 we provide a series of slide valves 23 therefor, each valve being preferably tubular in form and having ports 24 that are closed against the entrance of steam when the valve is in its normal position, but are exposed to the steam in the steam chest when the valve is withdrawn. Each valve is provided with a head 25 and this head is adapted to engage a cam track 26 provided on a disk 27 that is mounted on the shaft 3 within the steam chest, and is capable of revolution therein for the purpose of timing the admission of steam to the piston. There are as many of the valves 23 as there are passages 18, and with each revolution of the piston these valves will be successively operated, and upon being pulled out and the ports 24 exposed the live steam will enter a passage 18 from the steam chest and from thence pass through the ports 19 and 22, project one of the radially moving wings out against the wall of the cylinder and flow into the space between that wing and the abutment 6.

The lap of the valve on the cam surface 8 determines the degree of expansion of the steam in the chamber 5. For instance, the disk 27 may be adjusted so that its cam track will operate the valves close to the abutment so that hardly any expansive force of the steam will be utilized, or the cam track may be adjusted to hasten the operation of the valves and admit steam to the passages and the ports 19 some little time before they reach the abutment, and during this period the piston will be driven by the expansive force of the steam admitted through the preceding valve. We may swing the disk 27 so far around that the cam track will open and close the valves when the ports 19 are closed by the surface 8 and when this has been done no steam at all will be admitted to the cylinder chamber. The use of this disk with the cam track enables us to accurately control and time the admission of steam to the cylinder and utilize the expansive force or not as desired, and we regard this part of the engine as an important feature.

For the purpose of changing the time of operation of the valves and the admission of steam to the cylinder piston and also vary the period of cut off, we provide an arm 29 on the disk 27 having a slot 30 in which a pin 31 secured on a crank arm 32 is slidable, said crank arm being mounted on a lever 33 in the end of the cylinder and movable over a rack 34. By the adjustment of this lever the disk 27 is oscillated and the period of operation of the valves to admit steam and cut it off from the piston is hastened or delayed. This engine has but few moving parts, the piston is accurately balanced and there will be no undue friction arising from end thrust. The principle explained may be embodied in engines of different sizes and also in an engine of a two way type.

We claim as our invention:

1. In a rotary engine, the combination, with a cylinder having a steam chamber and an abutment formed in its wall, of a shaft, a piston secured on said shaft and provided with a series of radial recesses and wings or slides fitting within said recesses, passages extending lengthwise in said piston and having a series of ports extending outwardly to said cylinder chamber, and ports extending inwardly to the bottoms of said recesses, a series of valves provided in the ends of said passages and movable independently of one another, a steam chest being formed between said valves and the head of said cylinder, and means located in said steam chest and comprising a disk loosely mounted on said shaft and having a cam track for opening and closing said valves successively to admit pressure to said passages or to cut it off therefrom and a lever mechanism connected with said disk for rotating it on said shaft to vary the time of engagement of said valves with said cam track for the purpose specified, substantially as described.

2. In a rotary engine, the combination, with a cylinder having a steam chamber, of a revolving piston having passages extending lengthwise therein, and ports leading outwardly therefrom into said cylinder, sliding valves arranged in said passages in one end of said piston and having projecting heads and annular grooves therein and adapted to move lengthwise of said piston to open or close said passages, a normally stationary disk having a cam surface adapted to enter the grooves in said heads and move said valves lengthwise to open and close them successively, and means for revolving said disk to adjust its cam track and vary the time of operation of said valves and hasten or delay the time of admission of steam to said chamber, for the purpose specified.

3. In a rotary engine the combination, with a cylinder having a steam chamber and an abutment formed in its wall and a cam surface leading to said abutment, of a shaft, a revolving piston secured on said shaft and provided with a series of radial recesses and wings or slides fitting within said recesses, said piston having a series of passages extending lengthwise therein, and provided with ports extending outwardly and communicating with said cylinder chamber, and said piston also having ports leading from said passages to the bottoms of said recesses, a series of reciprocating valves provided in one end of said passages and adapted to control the admission of fluid pressure thereto, a quadrant shaped disk loosely mounted on said shaft in said steam chamber, a cam track formed on said disk in the path of said piston valves and adapted to move said valves lengthwise to open and close them successively as they revolve past said cam track, and means for moving said disk in a rotary direction on said shaft to change the position of said cam track and vary the point of engagement of said valves therewith, whereby the lap of said wings or slides on said cam surface or the time between the opening of a valve and the passage of steam into the cylinder chamber may be varied for the purpose specified.

4. In a rotary engine, the combination with a cylinder having a steam chamber and an abutment formed in its wall, and a cam surface leading to said abutment on one side of a shaft, a piston secured on said shaft and provided with a series of radial recesses, wings or slides fitting within said recesses, said piston having a series of passages extending lengthwise thereof, and ports leading outwardly from said passages to the cylinder chamber and inwardly from said passages to the bottoms of said recesses, a series of reciprocating valves provided in said passages at one end of said piston, a disk loosely mounted on said shaft near said valves, a cam track carried by said disk in the path of said valves and adapted to move them lengthwise to open or close said passages, said disk having a slotted arm, a crank arm having a pin that is slidable in said slotted arm, and an operating lever connected with said crank and whereby said disk may be rotated on its shaft to change the position of said cam track and vary the time of operation of said valves, and thereby increase or decrease the lap of said wings or slides on said cam surface for the purpose specified.

5. In a rotary engine the combination with a cylinder having a steam chamber and an abutment formed in its wall, and a cam surface leading to said abutment, of a shaft, a piston secured on said shaft and provided with a series of radial recesses, wings or slides fitting within said recesses, said piston having a series of passages extending lengthwise thereof, and ports leading outwardly from said passages to the cylinder chamber and inwardly from said passages to the bottoms of said recesses, a series of reciprocating valves provided in said passages at one end of said piston, a disk loosely mounted on said shaft near said valves, a cam track carried by said disk in the path of said valves and adapted to move them lengthwise to open or close said passages, and means for rotating said disk to change the position of said cam track and vary the time of engagement of said valves therewith for the purpose specified.

6. In a rotary engine, the combination with a cylinder having a steam chamber and an abutment formed in its inner wall, and a cam surface on one side leading to said abutment, said abutment comprising a square shoulder formed in the wall of said cylinder at the terminus of said cam surface, of a shaft, a revolving piston secured on said shaft, and provided with a series of radial recesses and wings or slides fitting therein, said piston having a series of passages extending lengthwise therein and ports extending outwardly from said passages and communicating with said cylinder chamber and said piston also having ports leading from said passages to the bottoms of said recesses, a series of reciprocating valves provided in one end of said passages and controlling the admission of fluid pressure thereto, a steam chest being formed between said valves and the head of said cylinder, and means adapted to engage the ends of said valves to reciprocate them successively and admit pressure to said passages or cut it off therefrom, and said means being adjustable whereby the time of operation of said valves may be varied to increase or decrease the lap of said valves on said cam surface, for the purpose specified.

In witness whereof, we have hereunto set our hands this 19th day of March 1908.

BERNARD F. HOARD.
GEORGE A. PAINE.

Witnesses:
RICHARD PAUL,
J. A. BYINGTON.